United States Patent [19]
Williams

[11] Patent Number: 5,156,749
[45] Date of Patent: Oct. 20, 1992

[54] DEWATERING SYSTEM FOR SLUDGE REMOVAL

[76] Inventor: Jack R. Williams, P.O. Box 207, Westport, Wash. 98595

[21] Appl. No.: 556,013

[22] Filed: Jul. 19, 1990

Related U.S. Application Data

[63] Continuation-in-part of Ser. No. 296,447, Jan. 12, 1989, Pat. No. 4,944,873.

[51] Int. Cl.⁵ ............................................. C02F 11/12
[52] U.S. Cl. .................................. 210/770; 209/404; 209/413; 210/232; 210/241; 210/407; 210/409; 210/771; 210/791
[58] Field of Search .............. 209/243, 263, 320, 352, 209/404, 413; 210/188, 207, 209, 241, 396, 400, 401, 406–408, 413, 433.1, 526, 533, 534, 297, 298, 770, 771, 232, 513, 791, 800, 803, 249, 250, 237, 409

[56] References Cited

U.S. PATENT DOCUMENTS

| | | | |
|---|---|---|---|
| 1,331,900 | 2/1920 | Cartwright | 210/241 |
| 1,345,531 | 7/1920 | Cartwright | 210/241 |
| 1,510,742 | 10/1924 | Gutleben | 209/404 |
| 2,671,562 | 3/1954 | Bingman | 210/400 |
| 3,049,236 | 8/1962 | Cohen de Lara et al. | 210/770 |
| 3,317,049 | 5/1967 | Petretti | 210/241 |
| 3,332,556 | 7/1967 | Hirs | 210/770 |
| 3,363,769 | 1/1968 | Wilmot et al. | 209/413 |
| 3,768,657 | 10/1973 | Hoag | 210/526 |
| 4,192,747 | 3/1980 | Wykoff | 210/526 |
| 4,243,527 | 1/1981 | Leonard | 210/407 |
| 4,340,478 | 7/1982 | Stannard et al. | 210/293 |
| 4,436,622 | 3/1984 | Petretti | 210/232 |
| 4,578,198 | 3/1986 | Schmidt et al. | 210/241 |
| 4,882,054 | 11/1989 | Derrick et al. | 210/433.1 |

FOREIGN PATENT DOCUMENTS

| | | | |
|---|---|---|---|
| 1170215 | 3/1984 | Canada | 210/776 |
| 2161019 | 6/1973 | France | 210/800 |

*Primary Examiner*—Mary Lynn Theisen
*Assistant Examiner*—Joseph Drodge
*Attorney, Agent, or Firm*—Seed and Berry

[57] ABSTRACT

A dewatering system for use in the treatment of waste water is disclosed which includes a tank, an inclined filter bed having a plurality of filter elements and components for inducing a flow of air through the filter bed to accelerate drying of the removed solids. Also disclosed are components for adjusting the angle of inclination of the filter bed and mechanical components for removing solids from the filter elements. In one embodiment, the filter bed is disposed within an upper unit mounted for rotation on the tank floor to facilitate cleaning of the filters. Adjusting the angle of inclination of the filter bed provides access from the frame, below, for cleaning the underside of the filter.

21 Claims, 6 Drawing Sheets

DEWATERING SYSTEM FOR SLUDGE REMOVAL

This application is a continuation in part of application Ser. No. 07/296,447 filed on Jan. 12, 1989 now U.S. Pat. No. 4,944,873.

BACKGROUND OF INVENTION

This invention generally relates to waste water treatment and more particularly to a system for filtering solids from waste water and removing water from the solids.

In the conventional waste water treatment process one of the final steps involves the separation of solids from the water and the drying or "dewatering" of the removed solids (or sludge). Typically, this process includes the steps of chemically treating the waste water with a polymer known as a "floccing agent" to promote the aggregation of suspended solid particles. Next the treated waste water is fed into a tank or pond where the solids are permitted to settle. Finally, the water is drawn off, the solids are removed by mechanical means and dried.

Dewatering systems of this type are relatively slow and inefficient. The settling process requires about 24 hours at a minimum, thus limiting the amount o waste water that can be processed in any particular tank or pond. The systems include numerous moving parts and electric motors, so the operational and maintenance expenses are relatively high. For example, the direct operating cost of a system designed to process twenty thousand gallons per day is approximately $8.00 to $15.00 per thousand gallons of waste water processed.

Accordingly, it is an object of this invention to provide for a gravity dewatering system which will separate solids from waste water more rapidly than presently known systems.

It is the further object of this invention to provide for a gravity dewatering system which requires substantially less energy to operate than current systems.

Finally, it is yet another object of this invention to provide for a gravity dewatering system for waste water which involves fewer moving parts and thus has a lower operating cost than current systems.

SUMMARY OF THE INVENTION

This invention can be broadly summarized as providing for a gravity dewatering system for waste water treatment which includes a tank, a filter bed associated with the tank which is inclined with respect to the horizontal for removing solids from the waste water, and means for inducing air flow through the filter bed to facilitate drying of the removed solids.

In accordance with a more detailed aspect of this invention the filter bed is adjustably mounted for rotation to permit adjustment of the angle of inclination and includes a plurality of filters and a frame for supporting the filters.

In accordance with another aspect of this invention the system includes means for removing solids from the filters including an endless chain loop mounted above the filter bed and a plurality of spaced scrapers attached to the chain.

In accordance with a further aspect of this invention, the filter bed is disposed within an upper unit mounted for rotation on the tank floor to facilitate cleaning of the filters.

DESCRIPTION OF THE PREFERRED EMBODIMENTS

The novel features believed to be characteristic of this invention are set forth in the appended claims. The invention itself, however, may be best understood and its various objects and advantages best appreciated by reference to the detailed description below in connection with the accompanying drawings.

Figures 1, 2, 3, 4:
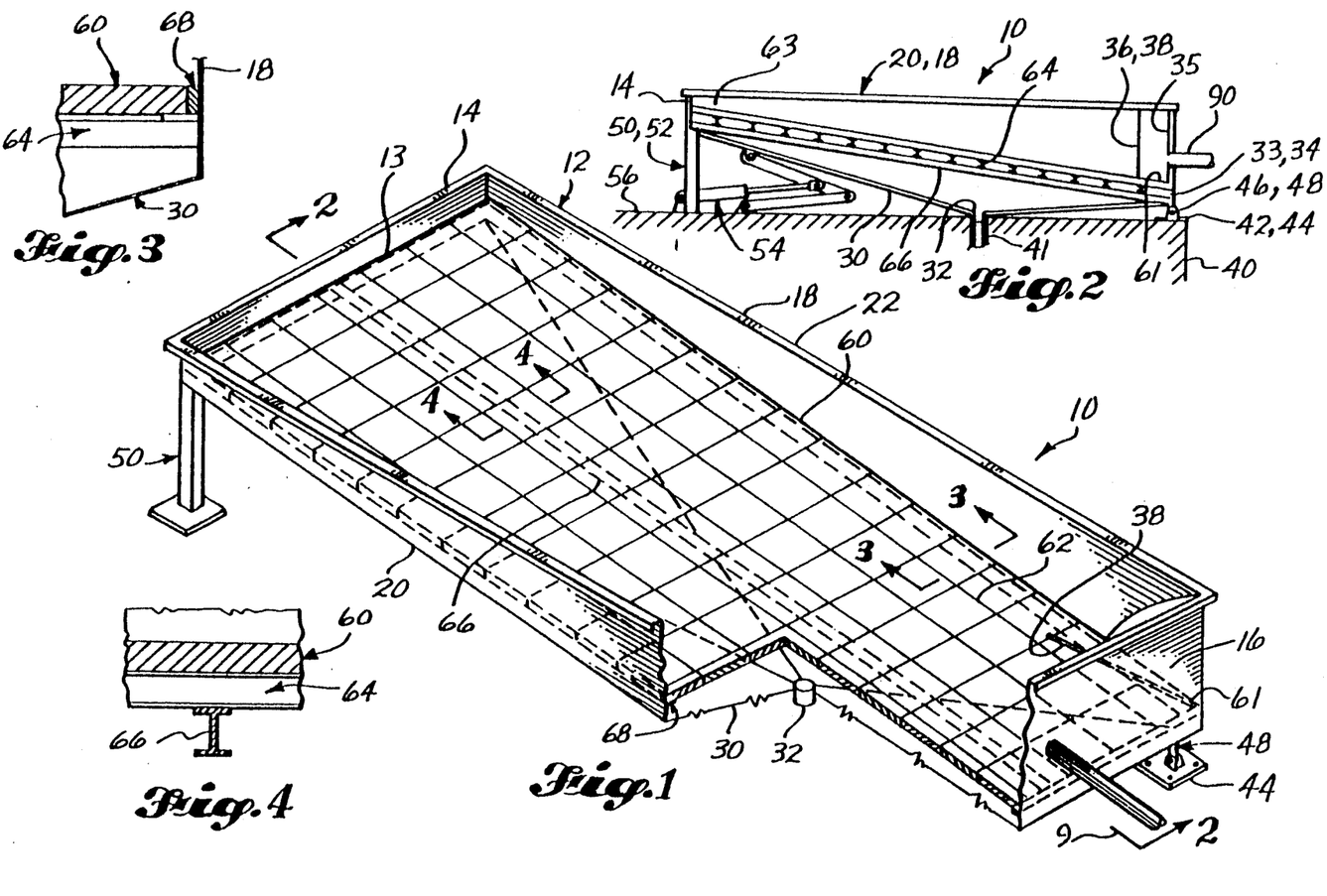
FIG. 1 is a perspective view, partially cut away, of a dewatering system constructed in accordance with the teachings of the present invention.
FIG. 2 is a sectional view taken at 2—2 in FIG. 1.
FIGS. 3 and 4 are partial sectional views taken at 3—3 and 4—4, respectively, in FIG. 1.

In FIGS. 1 through 6 of those drawings a dewatering system constructed in accordance with the teachings of the present invention is illustrated and generally designated by the numeral 10. As shown in FIG. 1, it includes a containment vessel or tank 12 which is formed of an upper wall 14, a lower wall 16, and two side walls 18 and 20, each preferably made of steel plate. The upper edge of each wall is reinforced by an angle member such as member 20. The tank also includes floor 30 which is formed of four pie shaped segments of steel plate which are welded at their intersections and to the adjoining tank walls. Together the segments form a floor which slopes downward in all directions toward drain 32. End 16 is pivotally mounted to the tank at points 33 and 34 and is appropriately sealed at its intersections with walls 18 and 20 and floor 30 to prevent leakage of waste water from the tank. Attached to inner surface 35 of end 16 are a pair of baffles 36 and 38 which are provided to direct the flow of sludge from the tank during cleaning operations as will be discussed below.

Normally the tank assembly is located on a structure such as cement dock structure 40 to facilitate removal of dried sludge from it as will be discussed later. The dock includes drain 41 in which drain 32 is removably seated. The tank is pivotally mounted near lower end 16 on pads 42 and 44 for rotation about points 46 and 48, respectively. On the opposite end near upper end 14 it rests on posts 50 and 52 which are fixedly mounted to the dock structure. Rotation of the tank is accomplished by hydraulically powered scissors assembly 54 which is pivotally mounted to floor 30 and dock 40 as shown in FIG. 2. In the context of this disclosure the horizontal direction is assumed to be one parallel to planer upper surface 56 of dock 40 and the vertical direction is assumed to be one normal to that surface.

Mounted within the tank is filter bed 60 which is inclined to the horizontal and has a lower end 61 and an upper end 63. The filter bed includes a plurality of rectangular filter elements such as element 62 which rest atop a group of I-beams, such as beam 64, each of which extends between and is welded to walls 20 and 22. Each of these beams rests on I-beam 66 which is centrally located in the tank and extends between walls 14 and 16. Filter elements sold under the trade name Wedge Water ® have been found to work effectively for normal treatment applications but other types of filters may be substituted. The size of the mesh is determined by the size of the suspended particles and their consistency. In order to prevent waste water from by-passing the filters near the tank walls, caulking 68 should be placed between the filter elements and the walls as shown in FIG. 3.

Preferably, the angle of inclination "a" of the filter bed with respect to the horizontal is 6° but the angle can be adjusted by varying the height of posts 50 and 52 or by actuating scissors assembly 54. Alternately, of course, the tank could be fixed in position and the bed could be pivotally mounted in the tank and rotated by some means to provide the adjustment.

Figure 5:
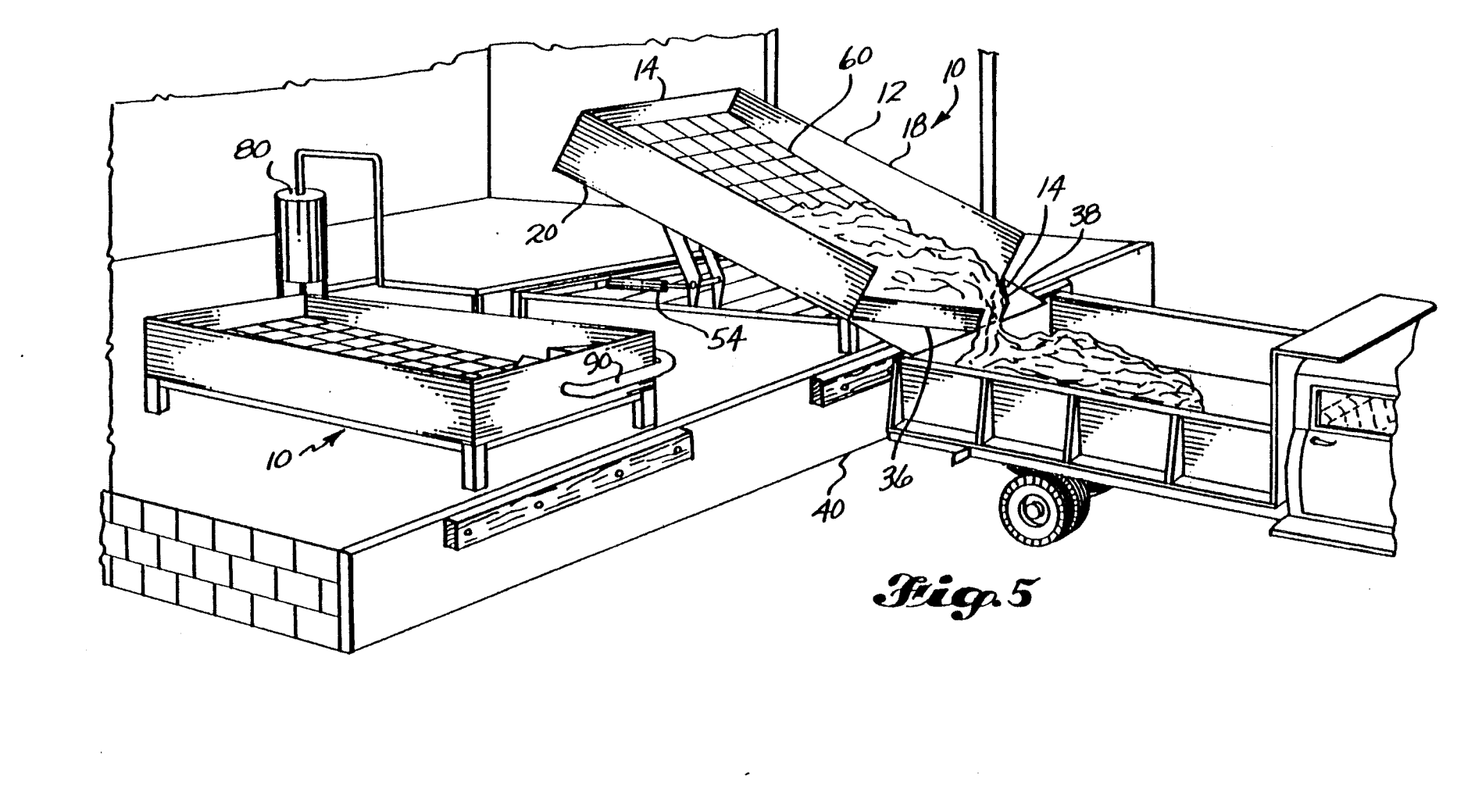
FIG. 5 is a perspective view showing the system of FIG. 1 elevated into a dumping position.

In operation, before waste water enters the system a polymer known as a floccing agent is mixed with it to induce the aggregation of suspended solids as discussed earlier. Referring to FIG. 5 the polymer is stored near the tank in container 80 which is preferably made of plastic and has a capacity of approximately 100 gallons. A rotating paddle assembly powered by a small electric motor is installed in the tank to continuously agitate the polymer. In order to mix the agent and the waste water the agent is injected into the pipe carrying the waste water and the mixture is then passed through a series of 90° elbows as it approaches tank 12. The churning of the mixture as it passes through these elbows results in a thorough mixing of the agent and the waste water. Next the treated waste water flows into tank 12 through pipe 90 as shown in FIG. 2.

Water entering the tank through pipe 90 is discharged onto the upper surface of filters located near the lower end of the filter bed and passes downward through the filters, leaving the suspended solids deposited on the upper surface of the filter screens. If it does so it also tends to flow toward the upper end of the filter bed due to the direction and velocity of the flow entering the tank. The solids tend to initially collect on the screens located near the lower end of the tank, and as they do so they gradually reduce the flow of water through the screen. As a result, waste water entering the tank tends to flow over the filled screens and continues moving toward the unfilled screens located toward the upper end of the filter bed. The result of this process is a more efficient use of the entire filtering surface.

Water passing downward through the filters falls onto tank floor 30 and is directed by its sloping surfaces toward drain 32. Preferably the drain is sized so that it can accommodate the normal flow of water from the filter bed without filling completely. It has been found that as the waste water passes through the drain it will draw air from the lower part of the tank with it provided that the drain is not completely full. The removal of air from the tank results in air being drawn downward through the filter screen, thus creating a continuous flow of air across it. The effect of this air flow through the screen is to dramatically reduce the time required to dry the solids trapped on the upper surface of the filter screens. For example, a dewatering system according to this invention can dry sludge to a particular water content in approximately two hours, whereas the time required to achieve the same dryness using a conventional system with a comparably sized tank would be approximately 24 hours. The increased efficiency which can be achieved in the dewatering process by utilizing this invention is apparent.

Obviously, other means can be employed to induce a downward flow of air through the filter bed to reduce the drying time of the solids. For example, a vacuum pump could be attached to one or more vents located in the tank below the filter bed to draw air from the portion of the tank lying below the bed. Alternately, a cover could be placed over the tank and means could be provided to increase the air pressure above the filter bed.

Another method to accelerate the drying of the removed solids would be to inject heated air into the tank below the filter bed. The injected warm air would tend to rise upward through the bed, causing drying by both heating and convection. The injection apparatus preferably would include a source of heated pressurized air and a duct connecting the source with the tank.

When the screens in the filter bed are substantially full of solids the flow of waste water into pipe 90 is shut off and the pipe is disconnected from end 16. As soon as the solids have been dried to the desired water content the filter bed is ready to be cleaned and prepared for re-use. In order to do so, end 16 is opened and rotated into a horizontal position and the tank is elevated by means of the scissors assembly into an unloading position as shown in FIG. 5. In that position the filter bed is sloped downward sufficiently that with some assistance the solids will easily flow toward end 16. As they pass over end 16, they are guided by baffles 36 and 38 into a truck bed or other means of conveyance for disposal.

Figure 6:
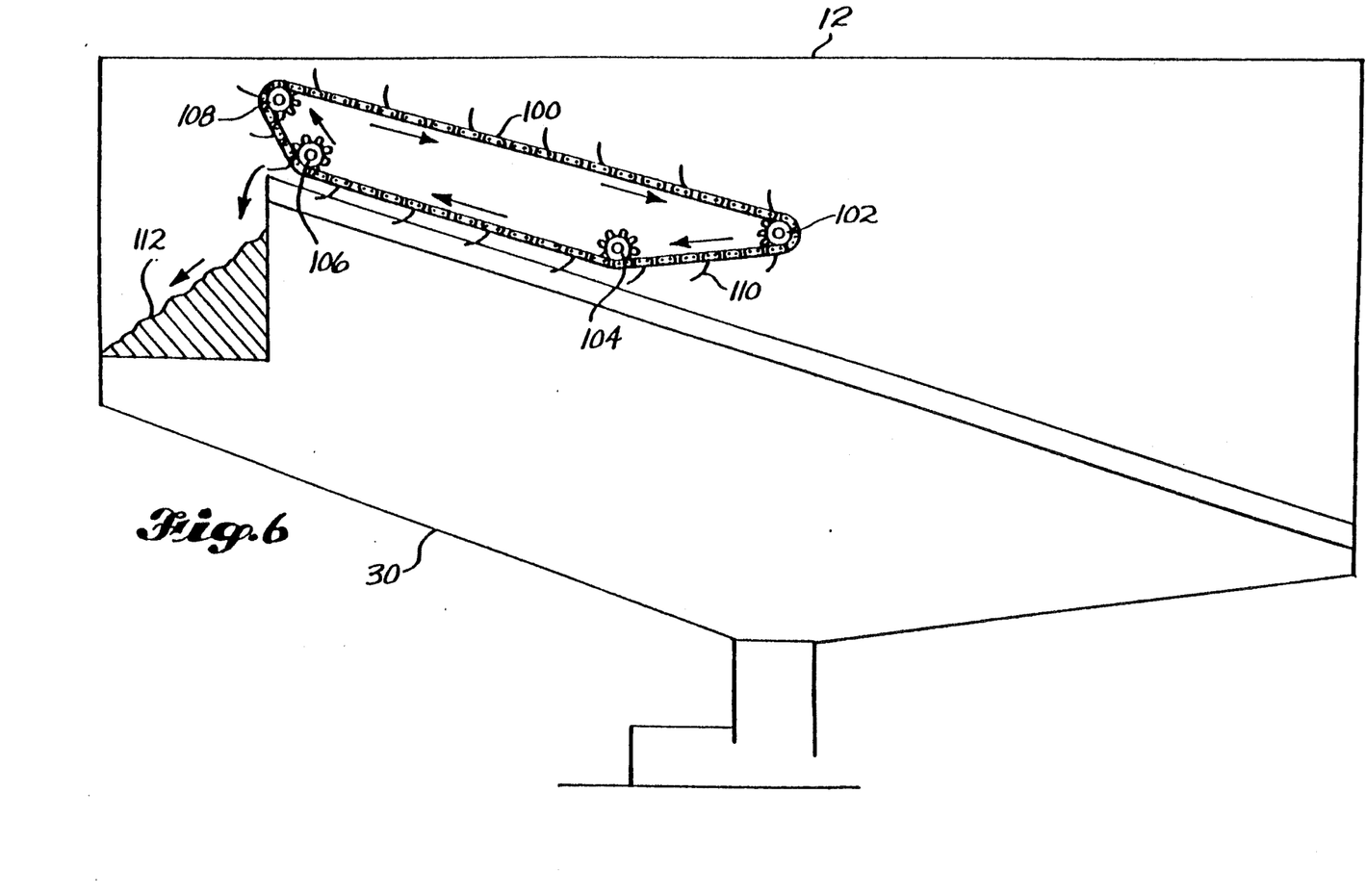
FIG. 6 illustrates another embodiment of the present invention including mechanical means for cleaning removed solids from the upper surface of the filter bed.

Another embodiment of this invention which includes a mechanical means for removing the solids from the upper surfaces of the filter screens is illustrated in FIG. 6. The removing means includes an endless chain 100 which is mounted for rotation on four sprockets 102, 104, 106 and 108. A plurality of equally spaced scrapers or squeegees such as squeegee 110 is mounted to the chain and the chain assembly is positioned such that scrapers moving between sprockets 104 and 106 will contact the upper surface of the screen. In operation, power is applied to sprocket 108 causing the chain to move in a direction indicated by the arrow. Solids accumulating on the upper surface of the filters between sprockets 104 and 106 will be transported upward along the filters by the squeegees and will be swept from the filter bed as they pass sprocket 106. At this point the solids will fall onto conveyor belt 112 where they will be transported for disposal. It has been found by experimentation that if the squeegees are moved at the rate of approximately 6 feet per minute the drying time of the sludge can be reduced to only a few minutes.

Figure 7:
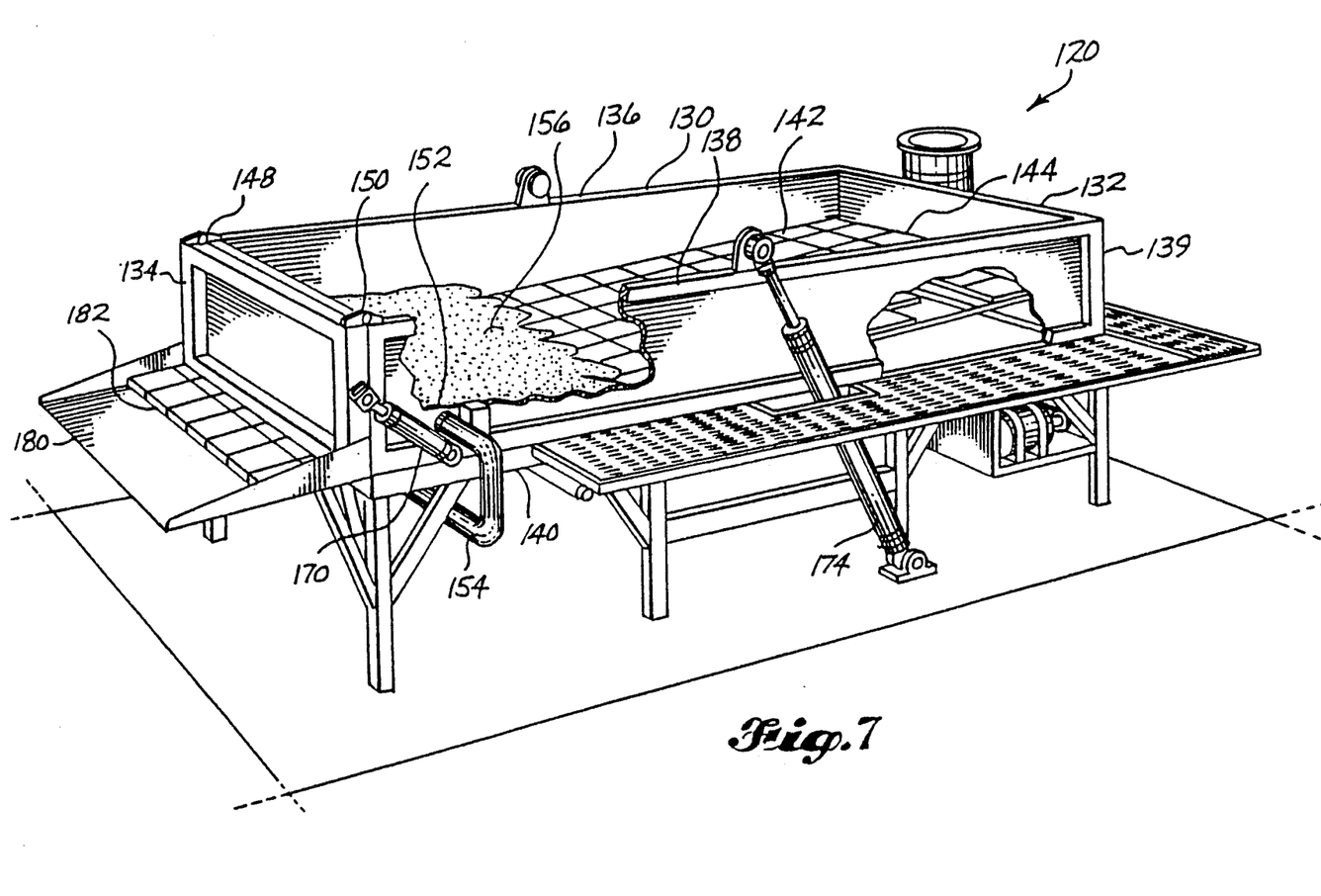
FIG. 7 is a perspective view, partially cut away, of a third embodiment of the invention.
Figure 8:
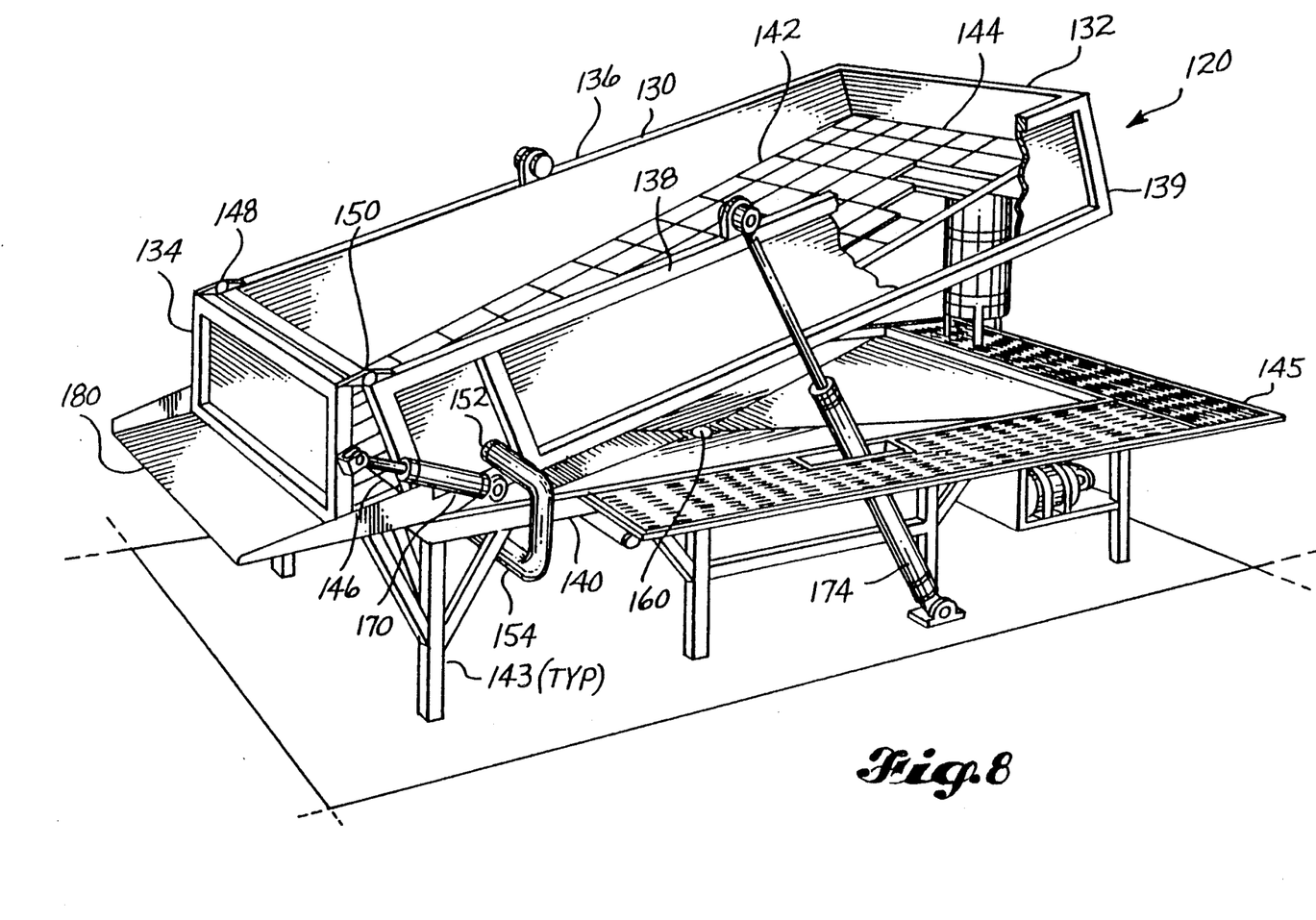
FIG. 8 is a perspective view of the embodiment of FIG. 7 in an elevated position.
Figure 9:
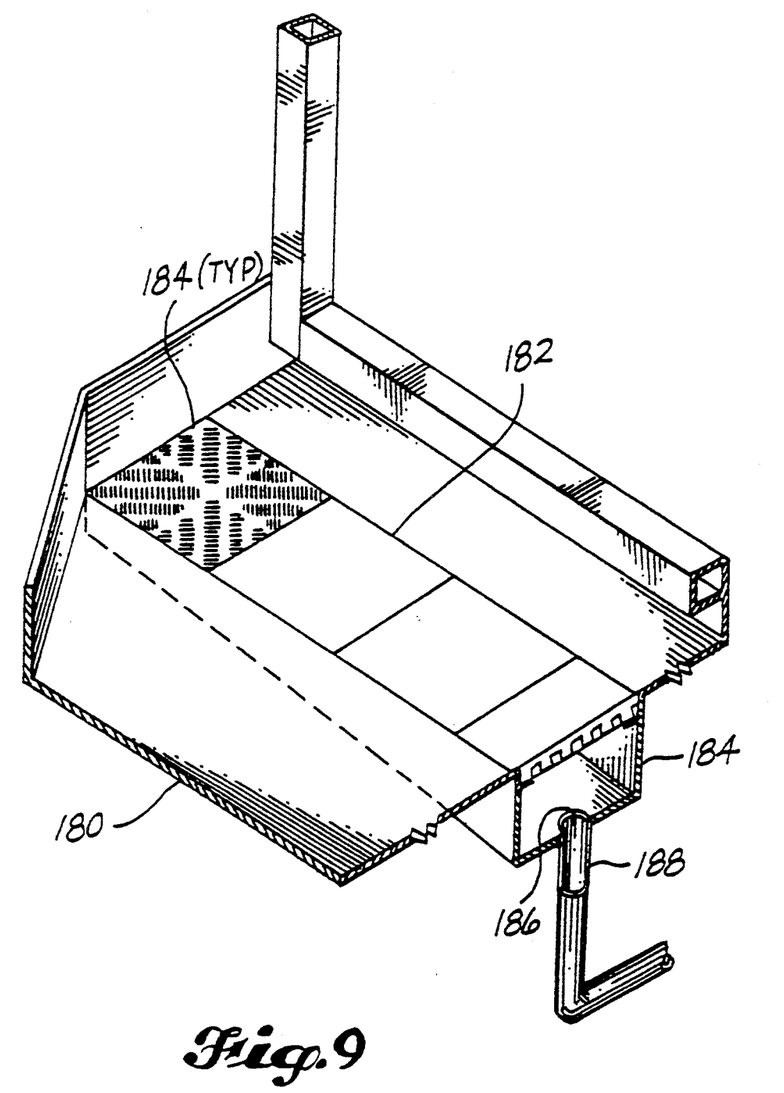
FIG. 9 is a perspective view of a portion of the embodiment of FIG. 7 including the dump chute.

A third embodiment of the invention is illustrated in FIGS. 7, 8 and 9. It has been found that during operation of the dewatering system the filter elements may become partially or totally clogged. If such clogging occurs it is usually necessary to drain the system, remove the individual elements and clean their upper and lower surfaces. One of the principal advantages of this embodiment is that it provides quick access to the undersurfaces of the elements without necessitating their removal from the filter bed. As a result the time required to clean the bed and return the system to full operation is significantly reduced.

Particularly, this embodiment differs from the first two described above in that the four side walls of the containment vessel and the filter bed form a unit which is pivotally mounted to the tank floor and can be rotated into an elevated position where both upper and lower surfaces of the filter elements can be cleaned without removing them from the filter bed.

Referring to FIG. 7, it can be seen that this embodiment, generally referred to by the numeral 120, includes containment vessel 130 which is formed of upper wall 132, lower wall 134 and opposing side walls 136 and 138 and tank floor 140. Filter bed 142, having an upper end 144 and a lower end 146 is mounted within the containment vessel and inclined to the horizontal as in the earlier described two embodiments. The upper, lower and side walls together with the filter bed form upper unit 139 which is pivotally mounted to the floor near the base of lower wall 134. The tank floor is supported by a frame including a number of vertical legs such as leg 143 and may include surface walkway 145 if desired. The structure of the filter bed, including the filter elements, is also as previously described. Preferably, the angle of the filter bed is fixed with respect to the horizontal at 6° but could be made adjustable by obvious means. Lower end 134 is hinged to side walls 136 and 138 at points 148 and 150, respectively. It can be rotated from the closed position shown in FIG. 7 to an open position to facilitate cleaning of the filter bed.

During operation waste water treated with a floccing agent is injected into the tank at inlet 152 through flexible pipe 154 and passes downward through the filter bed leaving a layer of solid material 156 on the upper surface of the bed. Pipe 152 is mounted to the inlet to permit rotation of upper unit 139 with respect to the pipe to eliminate the necessity of disconnecting it during cleaning as discussed below. The filtered water is collected by floor 140 and flows out of the tank through drain 160.

When cleaning of the filter elements becomes necessary the flow of waste water into the containment vessel is shut off and the filter bed is permitted to drain. When the draining is complete lower end 134 is rotated into the open position by hydraulic cylinders 170 and 172 (not shown) and the unit 139 is rotated into the elevated position as shown in FIG. 8 by hydraulic cylinders 174 and 176 (not shown) which are pivotally mounted to the side walls and the floor as shown. In that position the solid material on the upper surface of the filter elements can be removed from the filter bed through the opening beneath end wall 134. An alternate means for rotating unit 139 would include a powered lifting cable attached to the upper portion of end wall 132.

As the removed material passes onto dump chute 180 it is moved across a single row 182 of filter elements each which is similar to the elements mounted into the filter bed. The purpose of the row of elements is to provide an additional drain for any waste water remaining in the removed material. Referring to FIG. 9 which illustrates a portion of chute 180, fluid passing through any of the filters in row 182 such as filter 184 is collected in trough 186 and passes through drain 188 to be mixed with fluid passing from drain 160 in the tank floor.

Thus it can be seen that the present invention provides for an improved dewatering system for waste water treatment which incorporates many novel features and offers significant advantages over the prior art. Although only three embodiments of this invention have been illustrated and described, it is to be understood that obvious modifications can be made in it without departing from the true scope and spirit of the invention.

I claim:

1. A dewatering system for use in the treatment of waste water comprising a frame member:
   a tank adapted to receive waste water, the tank including a floor unit that receives water and an upper unit through which water passes and enters the floor unit, the upper unit being coupled to said floor unit and being pivotally mounted for rotation with respect to the floor unit between an operating position and an elevated position;
   a filter bed disposed within the upper unit and in a selected inclined operating position with respect to the horizontal for removing solids from the waste water as it is drawn downward through the bed by gravity, said filter bed having a lower side and an upper side;
   means for discharging waste water into the tank above the filter bed; and means including
   lifting means coupled to said tank for lifting said filter bed from said selected inclined operating position to said elevated position and separating the filter bed from said floor unit along at least a portion thereof to provide access to said lower side of said filter bed from said frame member for cleaning the filter bed from said lower side of said filter bed while simultaneously discharging solids from said upper side of the filter bed while said filter bed is in the elevated position.

2. The dewatering system of claim 1 wherein the filter bed has a lower end and an upper surface and further including a discharge means adapted to discharge waste water on the upper surface proximate the lower end.

3. The dewatering system of claim 1 wherein the filter bed includes at least one filter and a frame for supporting the filter.

4. The dewatering system of claim 1 wherein the filter bed is inclined at an angle of approximately 6 degrees with respect to the horizontal.

5. The dewatering system of claim 1 wherein said selected inclined position of the filter bed is adjustable and wherein the system includes means for adjusting the angle of said selected inclined position.

6. The dewatering system of claim 5 wherein the filter bed is mounted for rotation with respect to the, upper unit.

7. The dewatering system of claim 1 wherein the tank floor unit includes a drain for removing the discharged waste water from the tank.

8. The dewatering system of claim 7 wherein the tank floor unit slopes downward toward the drain to facilitate drainage of waste water from the tank.

9. The dewatering system of claim 1 further including means for inducing a flow of air through the filter bed to facilitate drying of solids removed from said waste water.

10. The dewatering system of claim 9 wherein the means for inducing a flow of air includes means for creating a differential in air pressure across the filter bed.

11. The dewatering system of claim 10 wherein the means for creating a differential air pressure includes means for reducing air pressure below the filter bed.

12. A dewatering system for use in removing water from solids comprising:
   a frame member;

a filter bed pivotally coupled to said frame member;
a filter element positioned as a part of said filter bed, said filter element having a front surface and a back surface;
a water inlet adjacent said filter bed, said water inlet being adapted to provide a flow of water containing solids to said filter bed;
a pivotal connection mechanically coupling said filter bed to said frame member means including;
a mechanical assembly coupled to said filter bed, including a support member for supporting said filter bed in generally a flat, inclined, operational position for removing said water from said solids and for alternatively supporting said filter bed in a generally raised, elevated, cleaning position spaced from the frame member and for providing acess to said back surface of said filter element from said frame member to facilitate the cleaning of said filter element from the back surface while said filter bed is coupled to said frame member in said raised position.

13. The dewatering system according to claim 12 wherein said generally flat inclined position is in the range of 0° to 12° with respect to the horizontal.

14. The dewatering system according to claim 13 wherein said generally flat inclined position is approximately 6° with respect to the horizontal.

15. The dewatering system according to claim 12 wherein said mechanical assembly includes:
a lifting means for lifting said filter bed to said raised position for cleaning the back surface of said filter bed simultaneously with solids being discharged from a front surface of said filter bed while said filter bed is in the raised position.

16. The dewatering system according to claim 15 wherein said lifting means includes a pair of hydraulic cylinders coupled to said filter bed.

17. The dewatering system according to claim 12 wherein said filter bed includes at least one additional filter element, each of said filter elements having a back surface facing down and a front surface facing upward, said solids collecting on said filter elements when water runs through said filter.

18. The dewatering system according to claim 17, further including:
a walkway adjacent said filter bed, said walkway positioned for supporting a person adjacent said filter bed when it is in the raised position to permit said person to clean said filter elements from the back surface while standing on said walkway.

19. A method of dewatering comprising:
introducing water to an upper surface of a filter bed, said water having solids therein, said filter bed being pivotally coupled to a frame, with a back surface of the filter bed facing the frame;
passing water through said filter bed and removing solids from said water by passing it through said filter bed, said solids being retained within said filter bed;
ceasing the flow of water through said filter bed;
raising said filter bed to an elevated position at one end, placing it at a higher angle while said filter bed is coupled to said frame by pivoting said filter bed with respect to said frame and providing acess to a back surface of the filter bed from said frame for cleaning a surface not previously exposed;
discharging solids from a front end of said filter bed while said filter bed is in said raised position to clean solids from said filter bed;
lowering said filter bed to a lower angle while said filter bed is coupled to said frame by pivoting said filter bed with respect to said frame; and
repeating said step of introducing water to an upper surface of said filter bed.

20. The method according to claim 19, further including:
collecting water that has passed through said filter bed in a tank below said filter bed;
passing water from said tank through an orifice in the bottom of said tank, gravity causing said water to flow through said orifice, said tank having a floor at an incline; and
drawing air through said orifice and through said filter bed simultaneously with water flowing through said orifice, said water providing a force to draw air into said orifice with said water and said filter bed being mounted in said tank in a sealed, airtight manner such that air passing out of said tank must be drawn through said filter, said air flow through said filter reducing the drying time of said solids.

21. The method according to claim 19, further including:
exposing a back surface of said filter bed while said filter bed is in said elevated position; and
cleaning said filter bed by access to a back surface of filter elements within said filter bed while said filter bed is in said elevated position simultaneously with solids being discharged from said front end of said filter bed.

* * * * *

UNITED STATES PATENT AND TRADEMARK OFFICE
CERTIFICATE OF CORRECTION

PATENT NO. : 5,156,749

DATED : October 20, 1992

INVENTOR(S) : Jack R. Williams

It is certified that error appears in the above-identified patent and that said Letters Patent is hereby corrected as shown below:

In column 7, claim 12, line 16, please delete "acess" and substitute therefor --access--.

In column 8, claim 19, line 14, please delete "acess" and substitute therefor --access--.

Signed and Sealed this

Fifth Day of October, 1993

*Attest:*

BRUCE LEHMAN

*Attesting Officer*     Commissioner of Patents and Trademarks